June 30, 1931.  M. M. GOLDBERG  1,812,001
CASH REGISTER
Original Filed Jan. 5, 1922   3 Sheets-Sheet 1

Inventor
Maximilian M. Goldberg
By
His Attorneys

June 30, 1931.  M. M. GOLDBERG  1,812,001

CASH REGISTER

Original Filed Jan. 5, 1922    3 Sheets-Sheet 2

Inventor
Maximilian M. Goldberg
By
His Attorneys

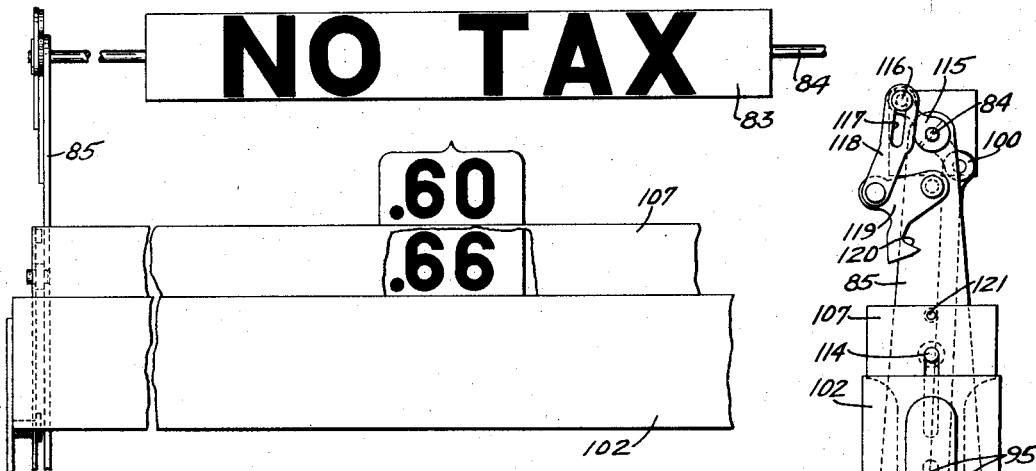
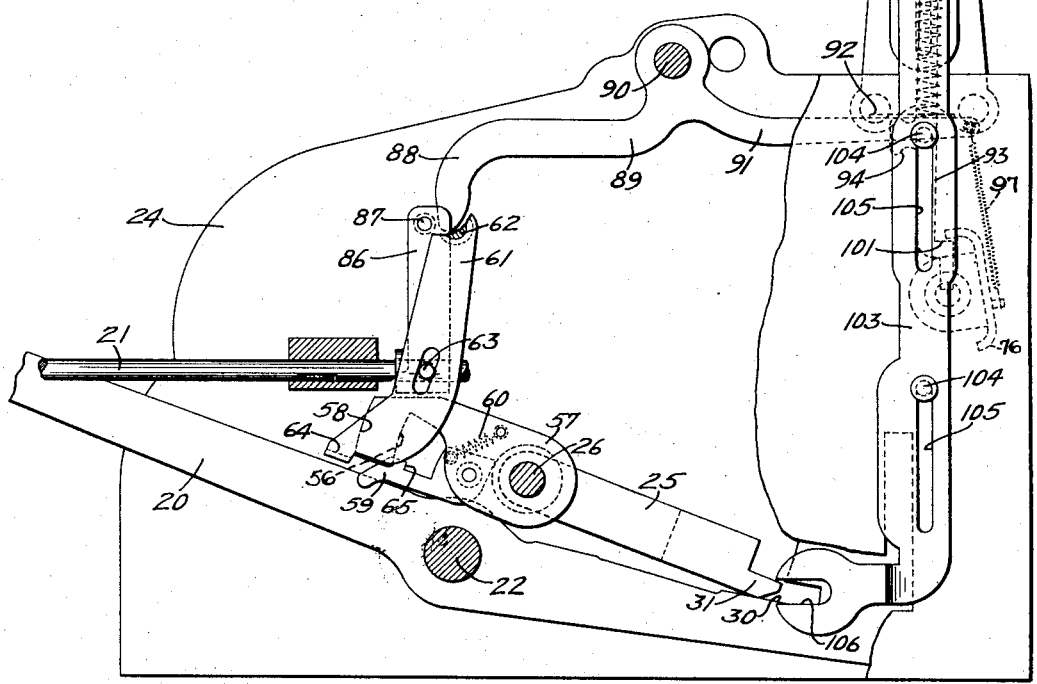

Patented June 30, 1931

1,812,001

UNITED STATES PATENT OFFICE

MAXIMILIAN M. GOLDBERG, OF DAYTON, OHIO, ASSIGNOR TO THE NATIONAL CASH REGISTER COMPANY, OF DAYTON, OHIO, A CORPORATION OF MARYLAND

CASH REGISTER

Original application filed January 5, 1922, Serial No. 527,265. Divided and this application filed July 23, 1926. Serial No. 124,443.

This invention relates to improvements in indicating mechanism adapted for use with cash registers and like machines.

The subject matter of this application constitutes a division of the co-pending application of the same inventor, Serial No. 527,265, filed January 5, 1922 which issued into Patent No. 1,755,504 on April 22, 1930.

One object of the invention is the provision of mechanism enabling a store selling taxable and nontaxable goods to indicate to the customer the purchase amount of a sale of non-taxable goods, and the total of the purchase amount and tax of a sale of taxable goods.

With these and incidental objects in view, the invention includes certain novel features of construction and combinations of parts, the essential elements of which are set forth in appended claims, and a preferred form or embodiment of which is hereinafter described with reference to the drawings which accompany and form part of the specification.

Of said drawings:—

Fig. 4 is a detail view of the indicating mechanism.

Fig. 5 is a right hand side elevation and partial sectional view showing various parts of the indicating mechanism.

In general

The machine in general includes groups of amount or purchase keys, a key representing a "tax" transaction, and another key representing a "no sale" transaction. The operation of the machine to register a sale in which there is no tax requires only the depression of the proper "purchase" keys.

The operation of the machine to register a sale of taxable goods is effected by depressing first the "tax" key and then the keys representing the amount of the purchase.

The indicators differ from the usual indicators provided for this type of machine in that they are constructed to indicate, automatically, the amount of the sale plus the tax assessed thereon, when the article sold is taxable. When no tax is collected, however, the indicators will show just the purchase price of the article.

Keyboard and driving mechanism

Figure 1:
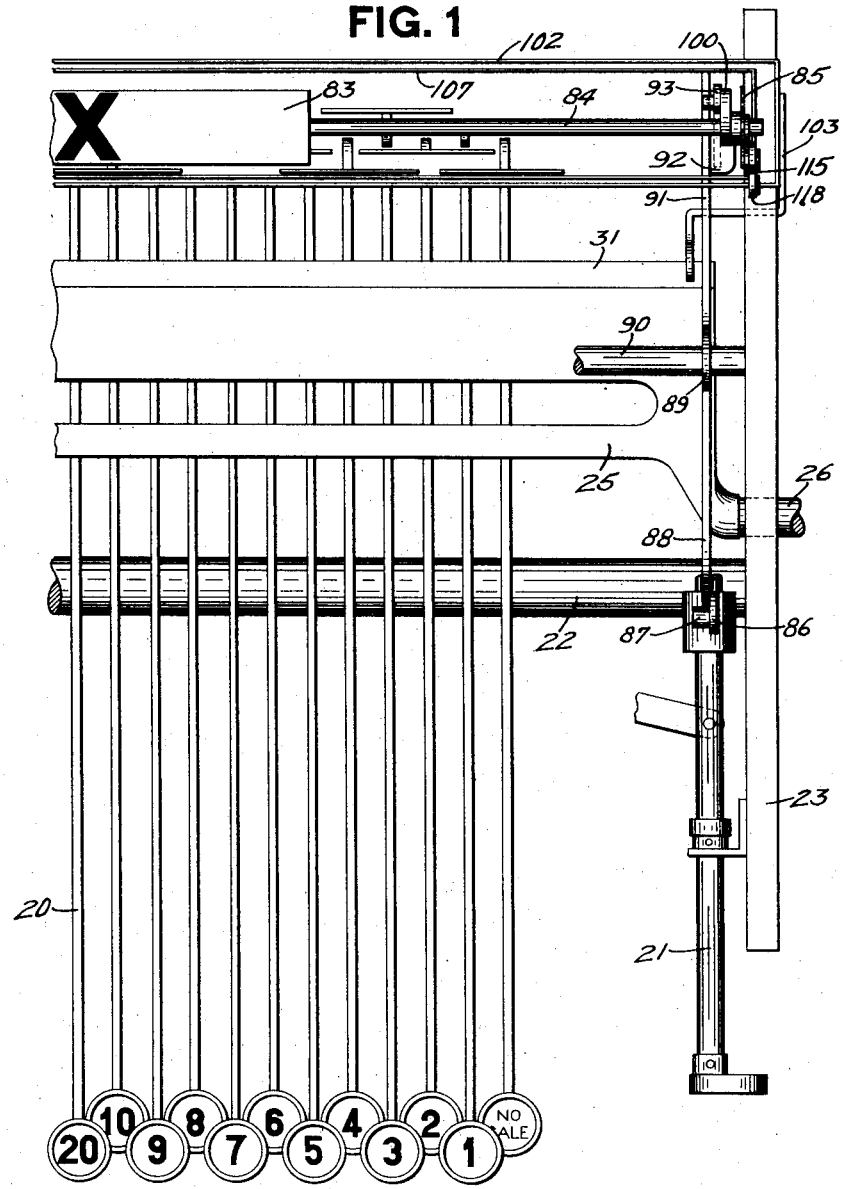
Fig. 1 is a top plan view of a portion of the key board and indicating mechanism.

Described in detail, the machine includes a series of amount or purchase keys 20, (Fig. 1) a "no sale" key, and a "tax" key 21. All of the keys 20 are pivotally mounted on a transverse rod 22, supported in the side frames 23 and 24. Common to all of the keys 20 and resting on the keys near the rear ends thereof is a key coupler 25 supported by trunnions 26 having bearings in the side frames. Each of these keys is provided with a notch 30 adapted to cooperate with a lip 31 on the rear edge of the key coupler.

Figure 2:
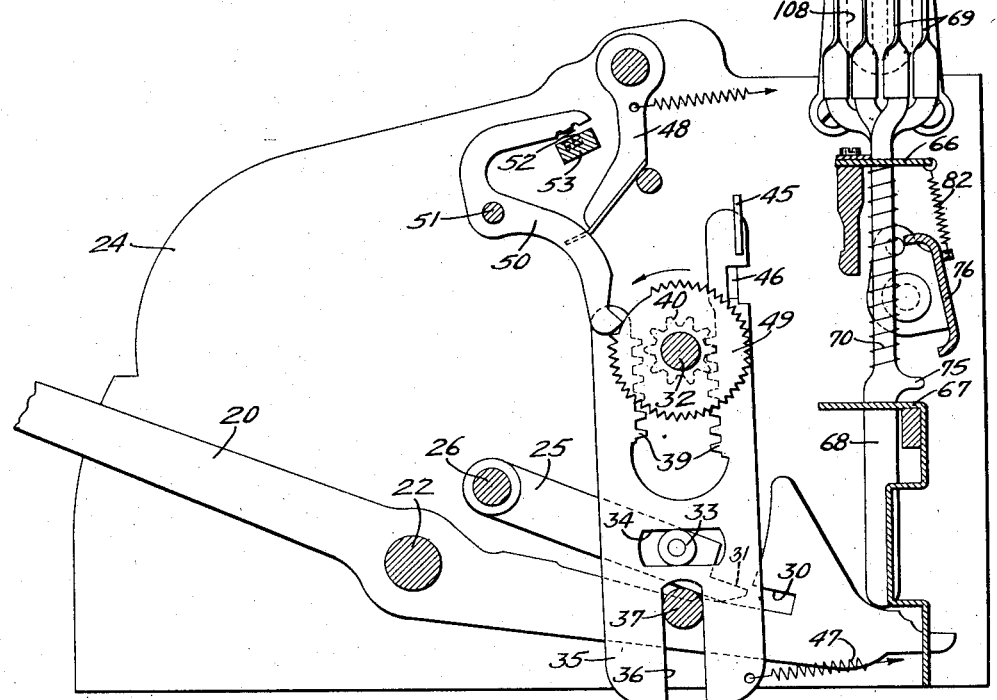
Fig. 2 is transverse section with certain parts omitted for the sake of clearness.

A rotation shaft 32 (Fig. 2) supported in the side frames is given a complete rotation upon each reciprocation of the key coupler. The driving means to rotate the shaft 32 includes a roller 33 mounted on a stud projecting from the right hand end of the key coupler, the roller 33 entering a slot 34 formed in a vertical reciprocable double rack 35. At its lower end the rack is bifurcated at 36 to straddle a stud 37 on the right hand side frame. At its upper end the rack is provided with oppositely facing rack teeth 39, which cooperate with a pinion 40 fast on the rotation shaft 32. A flange 45 on the side frame cooperates with a flange 46 on the rack to maintain the rack and pinion in mesh. The rack teeth are alternately thrown into and out of mesh with the pinion by a spring 47 and a spring pulled pawl 48.

As is well known in this art, the counter-clockwise movement of the key coupler 25, through the roller 33, raises the double rack 35, and the right hand teeth 39 turn the pinion 40 and shaft 32 counter-clockwise until the coupler 25 reaches the limit of its counter-clockwise movement. At this point, in the operation, the flange 46 has passed upwardly to the left of the flange 45 and as the former leaves the latter the spring 47, due to the fact that the point of its attachment to the double rack 35 has been moved above the horizontal center of the stud 37, rocks the double rack to move the flange 46 to the right of the flange 45, disengage the right hand teeth 39 from the pinion 40, and engage the left hand teeth 39 with said pinion. Now, as the key coupler 25 returns, clockwise, to its normal position, the left hand teeth 39 will complete the counter-clockwise rotation of the pinion 40 and shaft 32.

A ratchet or full-stroke disk 49 fast to the shaft 32 cooperates with a full-stroke pawl or lever 50, pivoted at 51 to the right hand side frame and held in engagement with the ratchet 49 by a spring 52 seated in a lug 53 on the right hand side frame, to prevent retrograde movement of said shaft.

Tax key

When a taxable article is sold, and it is desired to indicate the amount of tax in the machine a mechanism is provided which renders the tax indicators effective. This mechanism will now be described.

Mechanism is provided, as shown in Fig. 5, to retain the "tax" key, when pushed in, in its tax registering position until the end of the operation of the machine. This mechanism includes a retaining arm 57 provided with a hub pinned to the right hand key coupler trunnion 26. This arm is provided with a downwardly extending finger 58. A spring drawn latch pawl 59 is pivoted to the arm 57, and its movement under the influence of a spring 60 is limited by contact with the hub of said arm. An arm 61 pivoted to the side frame at a point 62 is slotted to receive a stud 63 carried by the "tax" key 21. When the "tax" key is moved inwardly it rocks the arm 61 counter-clockwise and a flange 64 on the arm 61 strikes and swings the latch pawl 59 until said flange passes a shoulder 65 on said pawl. The spring 60 then snaps the latch pawl 59 to retain the tax key 21 in its depressed position. Now, as the key coupler 25 rocks counter-clockwise, the retaining arm 57 is rocked likewise and the latch pawl 59 moved bodily downwardly away from the flange 64 of the arm 61. When the flange 64 is released from the shoulder 65 of the latch pawl, the arm 61 is rocked clockwise, by the tax key restoring spring (not shown), until the flange 64 contacts the right hand or rear edge 56 of the finger 58 of the retaining arm 57. As the arm 57 continues its counter-clockwise movement the flange 64 slides along the rear edge 56 of said arm.

When the key coupler 25 rocks clockwise to its normal position, the retaining arm 57 is rocked clockwise and moves the latch pawl 59 bodily upwardly and said latch pawl strikes the flange 64 of the arm 61 and the latch pawl is rocked counter-clockwise about its pivot until the finger 58 of the retaining arm 57 has been raised above the flange 64. At this point in the operation, the flange 64 is no longer restrained by either the retaining finger 58 or the latch pawl 59, and the tax key restoring spring (not shown) restores the tax key 21 to its normal position thus returning the arm 61 to its normal position.

Indicating mechanism

Indicating mechanism is provided for indicating the amount of the sale, when no tax is assessed thereon and to indicate the total of the amount of the sale plus the amount of the tax, when the article sold is taxable. The mechanism for operating the indicators and exposing the appropriate figures with relation to the character of the sale will now be described.

Slidably mounted in guide plates 66 and 67 (Fig. 2) just above the rear end of each of the keys 20 is an indicator rod 68 which carries at its top one of a series of tablets 69 of a type well known in the art. The indicator rods are yieldingly held in their lower most positions by springs 70 so that their lower ends are in contact with the rear ends of the keys 20. Each of the indicator tablets 69 bears a special character or characters preferably identical with the character or characters appearing on the forward ends of their appropriate keys, as well as having a character or characters representing the amount represented by that particular key plus the appropriate amount of the tax therefor. For example, the amount "60¢" is on the upper portion of the indicator tablet associated with the 60¢ key, while on the lower portion of this tablet is the amount "66¢", this being the previously mentioned amount of "6¢" plus the tax "6¢." Mechanism, which will be described later, is provided to conceal from view either one of the two amounts, depending upon whether the sale registered has been of a taxable or non-taxable article.

Figure 3:
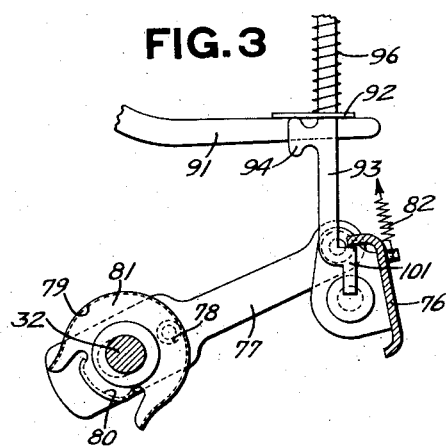
Fig. 3 is a detail view of a portion of the indicator operating mechanism.

It is apparent that the indicator rods 68 will be raised upon depression of their respective keys 20. Each rod is provided with a shoulder 75 to cooperate with a retaining bail 76 which is moved first clockwise as the shoulder is brought towards it to permit the same to pass and release the indicator rods elevated during the previous operation, and then counter-clockwise under said shoulder to support said rod in elevated position. As shown in Fig. 3 this movement is given to the retaining bail 76 by a pitman 77 pivotally connected thereto at one end and provided at its other end with an elongated slot through which the shaft 32 extends. The pitman carries a roller 78 which cooperates with cam flanges 79 and 80 on disk 81 fast on the shaft 32. Springs 82, set between the bail 76 and the guide 66 at each end of the bail, are em-

"Tax" and "No tax" indicators

An indicator 83 (Figs. 2 and 4) is provided for indicating to the purchaser whether or not a tax has been registered in the machine. This indicator is fast on a shaft 84, rotatably mounted in brackets 85 supported by the side frames of the machine. This indicator is of the block type and on two of its opposite faces carries the word "Tax" while on the remaining two opposite faces are the words "No tax". It will be remembered that the machine, with the parts in their normal positions, is adapted to register and indicate a transaction in which no tax is assessable, and therefore in the normal positions of the parts the words "No tax", as shown in Fig. 4, will be exposed. When, however, it is desired to register an article on which a tax is assessable the operation of the "tax" key 21 will position this indicator 83 to expose the word "Tax". The mechanism whereby the "tax" key positions the indicator 83 in either its "tax" or "no tax" position will now be described.

Fast on the rod 21 (Figs. 1 and 5) of the "tax" key is an arm 86 carrying the pin 87 cooperating with the forwardly extending arm 88 of a lever 89 pivotally mounted on a shaft 90. A rearwardly extending arm 91 of the lever 89 near its rear end is bent to form a flange 92 slotted to receive the lower end of a link 93. This link has a lug 94 (Figs. 3 and 5) located below and in engagement with the under side of the flange 92. The link is also provided with a pair of lugs 95 and between these lugs and the flange 92 is a spring 96 coiled about the link 93. When it is desired to expose the "tax" indicator to view the "tax" key is pressed inwardly, whereupon the pin 87 rocks the two-armed lever 89 counter-clockwise raising its rear end and the flange 92 thereby compressing the spring 96.

The link 93 is pivoted at its upper end to a short arm 100 fast on the shaft 84, supporting the indicator 83. At its extreme lower end the link is bent to form a projection 101 the top edge of which normally engages the under side of the upper flange of the retaining bail 76. The link 93 is therefore locked in its lower position until the bail 76 is rocked by the action of the cam 81 as a registration is effected, whereupon the spring 96 having been put under tension by depression of the tax key 21, will move the link 93 upwardly until the bottom of the projection 101 is above the retaining bail 76. The bail spring 82 (Figs. 2 and 3) then moves the upper flange of said bail beneath the projection 101 thus retaining the link 93 in its upper position. The upward movement of the link rocks the shaft 84 and indicator 83 in counter-clockwise direction, as seen in Fig. 5, ninety degrees, thereby exposing the faces carrying the word "Tax". Near the end of the operation of the machine, the tax key 21 is restored to its normal position by its restoring spring (not shown) as previously pointed out. The link 93, however, is retained in its upper position by the bail 76, thus leaving the word "Tax" exposed to public view until the machine is again operated.

Assume, that it is now desired to register a sale of non-taxable goods. The "tax" key is left in its normal outer position. The movement of the "tax" key to normal position during the previous "Tax" registering operation removes the pin 87 from engagement with the forwardly extending arm 88 on the lever 89. Now, during the instant "No tax" registering operation, the regular amount keys only, are operated, and when the retaining bail 76 is rocked clockwise by the pitman 77, (Fig. 3), a spring 97 (Fig. 5) restores the lever 89—91 to its normal position, and the flange 92 of the lever arm 91 through its contact with the lug 94 of the link 93, moves said link down to its normal position, thus rocking the arm 100, shaft 84, and indicator block 83 clockwise to conceal the indicia "Tax" and expose the indicia "No tax".

The machine is provided with a shield 102 (Figs. 1, 2 and 5) for the purpose of concealing the indicators from view while the proper one is being brought to its exposed position. This shield is carried by a pair of lifting bars 103 guided on studs 104 mounted in the side frames of the machine and projecting through slots 105 in said bars. At their lower ends these bars are bent and have open slots 106, into which the lip 31 of the key coupler projects to raise and lower the lifting bars 103. When one of the keys 20 has been depressed, and the key coupler raised thereby, the lifting bars 103 move the shield 102 to a position to conceal the indicator tablets. At the end of the operation, when the keys are restored to their normal positions, the shield 102 will again be brought to its normal position by the lowering of the key coupler.

An auxiliary shield 107, carried by the shield 102, is provided for normally concealing the lower set of figures on the indicator tablets from view (see Fig. 4). The shield 107 is provided with two legs 108 slotted at 109 to cooperate with studs carried by the lifting bars 103. Studs 114 on the brackets 85 cooperate with slots in the shield 107 to limit the movement of the said shield. It will be recalled that the lower set of figures carried by the indicator tablets represents the amount of the sale plus the amount of the tax assessable thereon, and therefore when a sale is made on which no tax is assessable, it is not desired that these figures be exposed.

However, when a taxable sale is made, it is desired to indicate the total amount of the purchase price plus the tax. Therefore, means is provided for causing the auxiliary shield 107, to be latched in its upper position, and when the shield 102 is lowered, to conceal the upper set of figures on the indicator tablets and expose to view the lower set. The mechanism for accomplishing this will now be described. Fast on each end of the shaft 84 carrying the "Tax" and "No tax" indicator is a short arm 115, (Figs. 1 and 5) carrying a pin 116, projecting through a slot 117 in a link 118. These links at their ends are pivotally connected to a pair of latches 119, which in turn are pivotally supported by the pair of brackets 85.

It will be remembered that when the "tax" key 21 is pressed in, the link 93 is raised by the spring 96 and the shaft 84 rocked counterclockwise (Fig. 5) by the arm 100. As the arms 115 are fast on the shaft 84 the links 118 rock the latches 119 about their pivots a sufficient distance to bring the hooks 120 thereof into the path of pins 121 projecting from the ends of the auxiliary shield 107. It can therefore be seen that, when the shield 102 carrying the auxiliary shield 107 is raised on a tax operation of the machine, the pins 121 will strike the lower faces of the hooks 120 of the latches 119, and as these latches are yieldingly held in the latching positions by the springs 96 the pins 121 will rock them clockwise about their pivots a sufficient distance to permit the pins to pass the ends of the hooks 120 thereof. When the pins have passed the hooks the springs 96 will cause the latches 119 to resume the positions to which they were moved under control of the tax key, and said latches will hold the auxiliary shield 107 in its upper position in order to expose to view the lower set of figures of the indicator tablets representing the amount of the sale plus the amount of the tax.

The "no sale" key hereinbefore referred to is similar in construction and operation to that of the amount keys. Its operation causes the release of the previously elevated indicator tablets and the exposure of the "no sale" indicator tablet.

Operation

The "tax" key is normally in its outer position and the machine is in condition to indicate the value of non-taxable goods in the usual manner.

When it is desired to register the amount of taxable goods, together with the tax thereon, the "tax" key is pushed in to prepare the machine for such registration. As the key is pushed in, a condition is set up which, upon operation of the machine will effect an operation of the block indicator 83 and control the upper shield 107 to expose the proper characters on the indicator tablets 69.

Operation of the machine releases the "tax" key, which is returned to normal by a spring (not shown), and prepares the machine for indicating the value of non-taxable goods upon the succeeding operation, by an operation of the amount keys in the usual manner.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:—

1. In a machine of the class described, the combination of a series of keys, indicators corresponding thereto and moved thereby, having a plurality of sets of figures of different values on one face thereof and a single movable means for always concealing all but one of the sets of figures at the completion of each operation.

2. In a machine of the class described, the combination of a series of keys, indicators corresponding thereto and operated thereby, said indicators having a plurality of sets of figures of different values thereon and a movable shield for always concealing all but one of said sets of figures at the completion of each operation.

3. In a machine of the class described, the combination of a plurality of indicators carrying two sets of figures thereon, keys for elevating the indicators to their visible positions, a shield for concealing the indicators during their elevation, and an auxiliary movable shield adapted to conceal one or the other of the sets of figures on the exposed indicators.

4. In a machine of the class described, the combination of a plurality of indicators carrying two sets of figures thereon, keys for elevating the indicators to their visible positions, a shield for concealing the indicators during their elevation, and an auxiliary shield carried by the first mentioned shield and adapted to conceal one or the other of said sets of figures on the exposed indicators.

5. In a machine of the class described, the combination of a plurality of indicators carrying two sets of figures thereon, keys for elevating the indicators to their visible positions, a shield for concealing the indicators during their elevation, an auxiliary shield carried by the first mentioned shield and adapted to be raised therewith, and latching means for maintaining the auxiliary shield in its raised position.

6. In a machine of the class described, the combination of a plurality of indicators carrying two sets of figures thereon, keys for elevating the indicators to their visible positions, a shield for concealing the indicators during their elevation, an auxiliary shield carried by the first mentioned shield and adapted to be raised therewith, latching means for maintaining the auxiliary shield in its raised position, and a key for controlling the latching means.

7. In a machine of the class described, the combination of a series of indicators, key operated means for raising the indicators to their visible positions each indicator having an upper and lower set of figures thereon, a shield for concealing the indicators during their elevation, and an auxiliary shield carried by the first mentioned shield for concealing either the upper or lower set of figures on the indicators.

8. In a machine of the class described, the combination of a plurality of shields connected together for simultaneous movement in one direction and either a simultaneous or dissimultaneous movement in the opposite direction, and means for determining the nature of the movement of said shields in the latter direction.

9. In a machine of the class described, the combination of a shield comprising a plurality of telescopically connected sections, means for moving said sections in one direction and one of said sections in the opposite direction at each operation of the machine, means for arresting the movement of another of said sections to prevent its return to normal.

10. In a machine of the class described, the combination of a plurality of indicator tablets each bearing a plurality of sets of indicia, means normally concealing said tablets, manipulative means for selecting indicator tablets for movement into indicating positions, and other manipulative means for controlling said concealing means for exposing any one of said sets of indicia.

11. In a machine of the class described, the combination of a plurality of indicator tablets adapted to be raised into indicating position, a plurality of sets of vertically spaced indicia thereon, means for normally concealing non-operated tablets in their lower positions and concealing tablets selected for operation as they are being raised, means for concealing one set of indicia and exposing another set, and manipulative means for controlling said last mentioned concealing means.

12. In a machine of the class described, the combination of a set of indicator tablets bearing a plurality of sets of indicia, means normally in position at the end of an operation of the machine to conceal one set and expose another, means for holding said concealing means in position to conceal said other set and expose the first set, and manipulative means for controlling the operated position of said concealing means.

13. In a machine of the class described, the combination of indicator tablets bearing two sets of amount indicia, an indicator provided with two indicia bearing a relation to and readable in connection with said amount indicia, means for exposing corresponding indicia on said tablets and indicator, and manipulative means for controlling the selection of indicia.

14. In a machine of the class described, a movable tablet indicator bearing a plurality of indicia, means for moving said indicator to displaying position, and movable means for concealing one of said indicia after adjustment of said indicator to the displaying position.

15. In a machine of the class described, the combination of a series of keys, an indicator for each key, each indicator adapted to be moved into displaying position by its corresponding key; a plurality of sets of indicia on the indicators, and a single means operable to conceal one set of indicia upon operation of the machine under control of any key.

16. In a machine of the class described, the combination of a series of keys, an indicator for each key, each indicator adapted to be moved into displaying position by its corresponding key, a plurality of sets of indicia on the indicators, and a single means operable upon operation of the machine under control of any key to expose one set of the indicia on the indicators.

17. In a machine of the class described, the combination of a plurality of keys bearing indicia, a plurality of indicators bearing two sets of indicia, a flash operable to conceal said indicator indicia as the indicators are adjusted, and a key for controlling the flash to expose a set of indicia after the indicators have been moved to adjusted position.

18. In a machine of the class described, the combination of a plurality of keys bearing indicia, a plurality of indicators bearing two sets of indicia, a flash operable to conceal said indicator indicia as the indicators are adjusted, and a key for controlling the flash to conceal a set of indicia after the indicators have been moved to adjusted positions and the operation of the machine completed.

19. In a machine of the class described, the combination of a plurality of keys, a key coupler operated thereby, a plurality of indicators corresponding in number to said keys and selected thereby for operation, a plurality of sets of indicia on said indicators, a flash actuated by said key coupler to conceal said indicators during adjustment, and means for controlling said flash to expose one of said sets of indicia after the indicators have been moved to adjusted positions.

20. In a machine of the class described, the combination of a plurality of keys, a key coupler operated thereby, a plurality of indicators corresponding to said keys and selected thereby for operation, a plurality of sets of indicia on said indicators, a flash actuated by said key coupler to conceal said indicators during adjustment, and means for controlling said flash to conceal one of said sets of indicia after the indicators have been moved to adjusted positions and the operation of the machine completed.

21. In a machine of the class described, a movable indicator bearing indicia located one in front of the other in the line of movement of said indicator, means for adjusting said indicator the same extent for exposing either of said indicia, and a flash movable in the direction of movement of said indicator to conceal the same during adjustment and to expose one of said indicia after adjustment.

22. In a machine of the class described, a movable indicator bearing indicia located one in front of the other in the line of movement of said indicator, means for adjusting said indicator the same extent for exposing either of said indicia, and a flash movable in the direction of movement of said indicator to conceal the same during adjustment and to conceal one of said indicia after adjustment.

23. In a machine of the class described, an indicator mounted for movement in a single plane, a plurality of indicia on said indicator, means for adjusting said indicator the same extent for displaying either of said indicia, and means movable in the direction of movement of said indicator to conceal the same during adjustment and to expose one of said indicia after adjustment.

24. In a machine of the class described, an indicator mounted for movement in a single plane, a plurality of indicia on said indicator, means for adjusting said indicator the same extent for displaying either of said indicia, and means movable in the direction of movement of said indicator to conceal the same during adjustment and to conceal one of said indicia after adjustment.

25. In a machine of the class described, the combination of a plurality of indicators carrying two sets of figures; a single indicator carrying two sets of indicia; keys to elevate the first mentioned indicators to their visible positions; a shield to conceal said first mentioned indicators while they are being elevated; and auxiliary shield carried by the first mentioned shield; a retaining member to hold the single indicator in one position, said member operated upon operation of the machine; a latch adapted to cooperate with the auxiliary shield, but normally disconnected therefrom; and means operable as a preliminary to an operation of the machine, to control the single indicator so that upon operation of the machine, when the retaining member is operated, the single indicator is actuated to change the exposition of its indicia, and the latch is simultaneously actuated to hold the auxiliary shield in its elevated position.

26. In a machine of the class described, the combination of a plurality of indicators carrying two sets of figures; a single indicator carrying two sets of indicia; a shaft supporting the single indicator; keys to elevate the first mentioned indicators to their visible positions; a shield to conceal said first mentioned indicators while they are being elevated; an auxiliary shield carried by the first mentioned shield; a retaining member to hold the single indicator in one position, said member being operated upon operation of the machine; a latch adapted to cooperate with the auxiliary shield, but normally disconnected therefrom; latch actuating means carried by the single indicator supporting shaft; and means operable as a preliminary to an operation of the machine, to control the single indicator supporting shaft, so that upon operation of the machine when the retaining member is operated, said indicator supporting shaft is operated to move the single indicator to change the exposition of its indicia and to operate the latch actuating means to cause the latch to hold the auxiliary shield in its elevated position.

In testimony whereof I affix my signature.

MAXIMILIAN M. GOLDBERG.